US012654750B2

(12) United States Patent
Liktor

(10) Patent No.: US 12,654,750 B2
(45) Date of Patent: Jun. 16, 2026

(54) BRAKE ASSEMBLY

(71) Applicant: KNORR-BREMSE SYSTEME FÜR SCHIENENFAHRZEUGE GMBH, Munich (DE)

(72) Inventor: Balazs Liktor, Budapest (HU)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 377 days.

(21) Appl. No.: 18/266,232

(22) PCT Filed: Nov. 8, 2021

(86) PCT No.: PCT/EP2021/080977
§ 371 (c)(1),
(2) Date: Jun. 8, 2023

(87) PCT Pub. No.: WO2022/122275
PCT Pub. Date: Jun. 16, 2022

(65) Prior Publication Data
US 2024/0043049 A1    Feb. 8, 2024

(30) Foreign Application Priority Data
Dec. 9, 2020    (EP) ..................................... 20212845

(51) Int. Cl.
*B61H 1/00*        (2006.01)
*B60T 17/22*       (2006.01)
(Continued)

(52) U.S. Cl.
CPC .............. *B61H 1/00* (2013.01); *B60T 17/228* (2013.01); *B61H 13/20* (2013.01); *B61H 15/0028* (2013.01); *F16D 66/026* (2013.01)

(58) Field of Classification Search
CPC ...... B61H 1/00; B61H 15/0028; B61H 13/20; F16D 66/026; F16D 66/025; B60T 17/228; B60T 1/04
See application file for complete search history.

(56) References Cited

U.S. PATENT DOCUMENTS

| 4,546,298 A | 10/1985 | Wickham et al. |
| 2007/0152107 A1 | 7/2007 | LeFebvre et al. |
| (Continued) | | |

FOREIGN PATENT DOCUMENTS

| CN | 104144813 B | 9/2016 |
| CN | 107000708 B | 8/2019 |
| (Continued) | | |

OTHER PUBLICATIONS

European Patent No. EP 3556624 to Ronse published on Oct. 23, 2019.*

(Continued)

*Primary Examiner* — Pamela Rodriguez
(74) *Attorney, Agent, or Firm* — Barnes & Thornburg LLP

(57) ABSTRACT

A brake assembly for a rail car includes at least one brake element for pressing against a rotor of a rail car wheel in case of a braking action; an actuator for driving the brake element, a linkage for transferring a braking force from the actuator to the brake element, at least one sensor device for measuring at least one parameter of the brake assembly, and the brake assembly further includes a trigger unit configured to enter its active state when a braking action occurs, wherein the trigger unit activates the sensor device in the active state.

13 Claims, 2 Drawing Sheets

(51) Int. Cl.
  *B61H 13/20* (2006.01)
  *B61H 15/00* (2006.01)
  *F16D 66/02* (2006.01)

(56) References Cited

U.S. PATENT DOCUMENTS

| | | | |
|---|---|---|---|
| 2013/0342362 A1 | 12/2013 | Martin | |
| 2016/0123421 A1 | 5/2016 | Staahl et al. | |
| 2021/0403057 A1* | 12/2021 | Basha | F16D 65/52 |

FOREIGN PATENT DOCUMENTS

| | | | |
|---|---|---|---|
| DE | 102008007940 B4 | 4/2011 | |
| EP | 1016576 A2 | 7/2000 | |
| EP | 2127975 B1 | 1/2012 | |
| EP | 3587204 A1 | 1/2020 | |
| WO | 2015003975 A1 | 1/2015 | |
| WO | 2019202032 A1 | 10/2019 | |

OTHER PUBLICATIONS

European Patent No. EP 4105100 to Liktor et al published on Dec. 21, 2022.*
International Search Report and Written Opinion Corresponding to PCT/EP2021/080977 dated Feb. 16, 2022.
Australian Office Action corresponding to AU 2021395250 dated Jul. 11, 2024.
Indian Office Action corresponding to IN Application 202337045773 dated Mar. 5, 2026.

* cited by examiner

1

BRAKE ASSEMBLY

CROSS REFERENCE AND PRIORITY CLAIM

This patent application is a U.S. National Phase of International Patent Application No. PCT/EP2021/080977 filed Nov. 8, 2021, which claims priority to European Patent Application No. 20212845.0, the disclosure of which being incorporated herein by reference in their entireties.

FIELD

Disclosed embodiments relate to a brake assembly for a rail car, in particular an unpowered rail car, such as a tank wagon or cargo wagon.

BACKGROUND

Conventional rail car brake systems include a plurality of brake shoes, a mechanical linkage assembly coupled with the brake shoes for pressing the brake shoes against the rail car's wheels when the linkage is shifted to a braking position, and a pneumatically-operated brake cylinder that, when actuated, shifts the mechanical linkage to its braking position. Rail car brake systems also include a manually-operated hand brake in a rail car that shifts its mechanical linkage to the braking position. The hand brakes are applied when the train is "parked" for preventing the train or the rail cars from moving, especially while not coupled with a locomotive for a time. The hand brakes are then manually released when the locomotive is once again coupled and the brake systems recharged so that the brake systems in the rail cars are once again controlled by their pneumatic brake cylinders.

WO 2019/202032 A1 describes a rail car brake system having a monitoring system comprising a sensing module for measuring a dislocation of different parts of a brake regulator device relative to one another. The monitoring module comprises a battery or an energy harvesting power module. However, the known monitoring system has a high power consumption. Because of this, the monitoring system using a battery is not sufficiently reliable between normal maintenance intervals which may lie several months or even years apart. The use of an energy harvesting power module has been shown to be disadvantageous because of the risk of errors in the power supply and also because retrofitting large numbers of unpowered cargo wagons with energy harvesting components is economically unreasonable.

SUMMARY

Disclosed embodiments provide a brake assembly, in particular for an unpowered tank or cargo wagon, that solves the disadvantages of the prior art, in particular to provide a brake assembly with a sensor for reliably monitoring for extended periods of time in a particularly energy-efficient manner, with a limited local power supply, such as a battery, or with a cost-efficient energy harvesting component.

BRIEF DESCRIPTION OF THE FIGURES

In the following, disclosed embodiments are described in more details the reference to the figures.

2

Figures 3, 4:
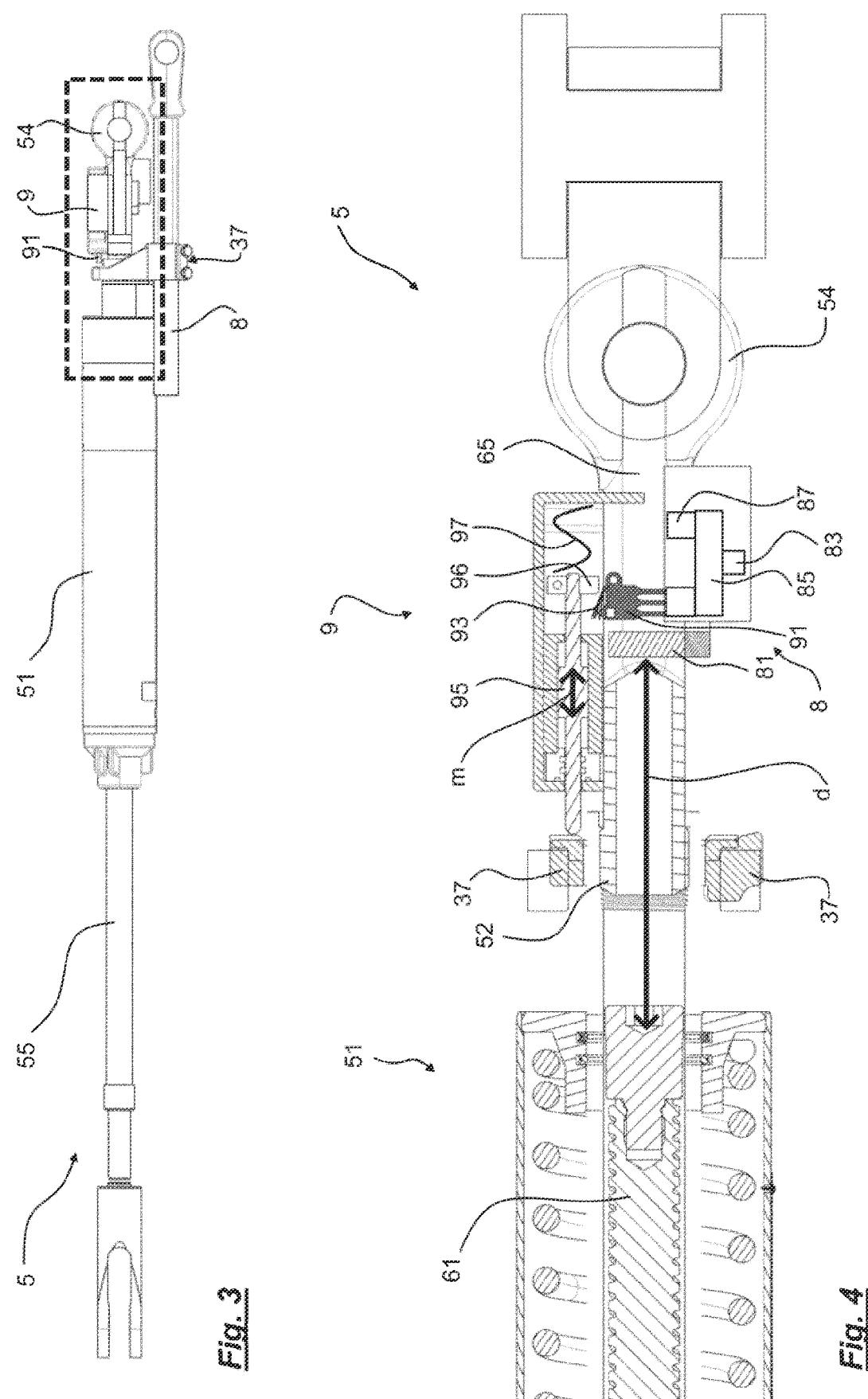

FIG. 3 shows a section of the brake assembly according to disclosed embodiments including a brake regulator; and FIG. 4 shows a detailed view of the sensor device and a trigger unit attached to the brake regulator in the brake assembly according to FIG. 3.

DETAILED DESCRIPTION

A brake assembly for a rail car is provided, in particular an unpowered rail car, optionally a tank wagon or cargo wagon. A cargo wagon may be an unpowered cargo wagon, and the monitoring system is optionally mounted entirely on an unpowered cargo wagon.

The brake assembly includes at least one brake element for pressing against a rotor of a rail car wheel in case of a braking action. The brake element may be realized as a brake pad, brake shoe or brake block. Disclosed embodiments may relate to a brake assembly including a brake element being a brake block, a brake shoe or a brake pad. Optionally, the brake element is a brake block or brake shoe suitable for pressing against the wheel tread or against a brake disk. In one embodiment, the brake block or brake shoe belongs to a disk brake system, whereby the brake block or brake shoe is pressed against a brake disk or laterally against the wheel. In an alternative embodiment, the brake element is a brake pad, the brake pad optionally belonging to a disk brake system, whereby the brake pad is pressed against a brake disk. In different embodiments of the present invention, the brake element may relate to any kind of friction-based braking. The rotor corresponding to the brake element may be a tread, such as a tread of a rail car wheel, or a brake disk firmly attached to a rail car wheel. The brake assembly further includes an actuator, optionally at pneumatic or hydraulic actuator, for driving the brake element, and a linkage for transferring a braking force from the actuator to the brake element. The brake assembly is actuated by the actuator. In particular, the actuator comprises a brake cylinder and a piston. The actuation is based on compressed air for a pneumatic actuator. Alternatively, the assembly includes a hydraulic actuator using a hydraulic actuating fluid, such as oil, to provide pressure for the hydraulic actuator.

The brake assembly also includes at least one sensor device for measuring at least one parameter of the brake assembly. A parameter of the brake assembly may include but is not limited to a parameter related to brake wear. Additionally or alternatively, a parameter of the brake assembly may be related to the flow and/or pressure of the hydraulic or pneumatic actuating fluid of the actuator. The brake assembly may include one or more further sensor devices for measuring one or more other parameters of the brake assembly, wherein the further sensor devices may include an accelerometer, a temperature sensor, a moisture sensor or the like.

According to disclosed embodiments, the brake assembly further includes a trigger unit configured to enter an active state when a braking action occurs. The trigger unit activates the sensor device in the active state. Optionally, the trigger unit is configured such that it senses a change of a stroking force and/or stroking movement of the actuator, the linkage attached thereto, and/or of one or more braking elements attached to the linkage. The trigger unit may be structurally designed such that it enters its active state after a minimal threshold of movement of one or more of the moving components of the linkage occurs. Alternatively or additionally, the trigger unit may be designed such that it enters its active state when a minimal threshold force, minimal threshold deformation and/or minimal threshold stress acting at the actuator, at a predetermined point in the linkage and/or at least one a braking element is reached. Optionally, the trigger unit senses a braking action at the beginning thereof so that it can activate or turn on the sensor device such that the sensor device is capable to perform one or more measurements of one or more parameters during the braking action. The sensor device may optionally be triggered by the trigger unit such that one or more measurements of one or more parameters of the brake assembly can be taken while a maximal braking force acts and/or a maximal dislocation of the braking elements during the braking action occurs. In particular, the trigger unit may have a passive state (off) in which the trigger unit leaves the sensor device idle or turns the sensor device off.

In one embodiment, the trigger unit is connected to the linkage. In particular, the trigger unit may be attached to the linkage. Optionally, the trigger unit is firmly attached to a movable or stationary component of the linkage. By providing the trigger unit directly to the linkage, any movement, deformation, force and/or stress acting upon the linkage can directly be detected by the trigger unit.

In another embodiment that may be combined with one of the aforementioned, the linkage includes at least one brake regulator device for adjusting the linkage in accordance with a wear level of the at least one brake element, wherein in particular the trigger is connected to the linkage, in particular attached to the linkage or arranged on the linkage or brake regulator device, between the brake regulator device and the actuator. The trigger unit can easily detect a trigger event initiated by the actuator causing the trigger unit to be activated. In this document, the term brake regulator device refers to a device for automatic adjustment of the clearance between brake elements and wheels. A brake slack adjuster is an example of such a brake regulator device. The brake regulator device forms the bridge between the brake elements, optionally brake blocks, and the actuator and the overall mechanical control of the brake. The brake regulator device contributes to the correct operation of the brake by absorbing the wear level of the brake elements, so that an equal force coming from the mechanical control results in a corresponding braking effect on the impact surface relating to the wheels, irrespective of the wear level of the brake elements. Characteristic hereby is that the brake regulator comprises a first part at one end and a second part at the other end which move further apart as the brake elements exhibit more wear. Optionally, the first part and second part mate in a sliding fit, for example a telescopic sliding fit.

In a particular embodiment of the brake assembly, the trigger unit is configured to enter its active state upon detecting linkage displacement. The linkage displacement may for example be detected by the trigger unit by a mechanical switch which causes a change its switching state once a predetermined displacement threshold is overcome by a particularly movable linkage component.

The linkage may include a brake rigging connecting the actuator to the regulator device and/or connecting the regulator device to the brake element. The brake rigging includes brake beam(s), brake rigging rod(s), and/or brake lever(s). Optionally, the brake assembly further comprises a brake rigging. Optionally, the brake rigging is configured for connecting the actuator to the brake regulator device.

In a further development, the trigger unit is configured to enter its active state upon detecting displacement of a first moveable component of the linkage in relation to a stationary component of the linkage, such as a mounting section connecting the linkage to the rail car. Additionally or alternatively, the trigger unit is confined to actor its active state upon detecting displacement of a first movable component of the linkage In relation to a second moveable component of the linkage. In addition or as an alternative, the trigger unit may be configured to enter its active state upon detecting displacement of a first movable component of the linkage in relation to a stationary component of the rail car, such as the rail car chassis.

In a further development, the trigger unit is configured to detect a displacement between the brake regulator device and a stationary component of the linkage system. In particular, the trigger unit is attached to the brake regulator device. Both the sensor device and the trigger unit may be attached to the brake regulator device. Thereby it can be achieved that the trigger unit is situated very close to the sensor device which it activates in the active state, wherein the sensor device may optionally be a sensor device for measuring a parameter related to the brake regulator device, such as a set distance dependent upon the current state of wear of one or more of the brake elements.

In one embodiment of the brake assembly which may be combined with one of the aforementioned embodiments, the trigger unit comprises a switch, in particular a microswitch, comprising a optionally mechanically actuated relay for opening and/or closing an electronic circuit. A switch such as a mechanical microswitch may provide the brake assembly with a very robust component realizing the trigger unit such that the trigger unit may reliably activate the sensor device, in particular during prolonged intervals between rail car maintenance.

According to a further development, the trigger unit includes a trigger rod moveable between a first position and a second position according to the displacement, wherein the trigger rod is in its first position while no braking action occurs and/or wherein a protrusion coupled with the trigger rod engages an electromechanical closing member of the relay in the first or second position, wherein in particular the trigger unit further comprises and a means biasing the trigger rod towards the first or second position.

In one embodiment that may be combined with one or more of the previous embodiments, the sensor device includes a transmitter for sending at least parameter of the brake assembly in particular to a sensor hub of the rail car, wherein the transmitter is optionally only activated in the active state. An example of a sensor hub is described in the applicant's application EP 3 608 184 A1 which is hereby incorporated by reference in its entirety.

In one embodiment, the sensor device includes a linkage position sensor in particular for determining a position of a first component of the linkage in relation to a second component of the linkage.

In a further development, the position sensor measures the distance between two reference points of the brake regulator device.

In another further development of the brake assembly which may be combined with one or more of the previously described embodiments, the brake regulator device comprises a hollow tube receiving a bracket for attaching the brake regulator device to the linkage and a moveable adjustment member, such as a threaded spindle, wherein the position sensor determines a distance between the spindle and the bracket.

Additionally or alternatively, in a further development of the brake assembly including a position sensor as a sensor device, the position sensor is optionally only activated in the active state.

In another further development of a brake assembly that may be combined with one of the above-mentioned embodiments, the sensor device includes a computing device and a data storage device, wherein the computing device is only activated in the active state and wherein the computing device is configured to calculate a parameter indicating brake wear based in particular on the measurement of the position sensor and to cause the transmitter to send the parameter indicating brake wear. When monitoring the wear of a brake element it is important to also take the wear of the wheel into account. The change of the dislocation between the first and the second part does not depend only on the wear of the brake element, but also on the wear of the wheel. Certain events can create a notable change in wheel diameter, which in the past could not be accounted for by passive measurements, only by actual inspection. Such events are for instance high-intensity brake maneuvers. Especially in brake events where the wheel continues to slide along the rail in a locked position (so-called "wheel flat"), thereby chafing of part of its mantle at a fixed position, this warrants immediate regrinding of the wheel to a circular form, which of course severely impacts the diameter of the wheel. Another event is the routine maintenance, which comprises regrinding of the wheels, typically every 600000 km or every 12 years, whichever comes first. When replacing worn brake elements with new brake elements, the aforementioned wear of the wheels must also be taken into account. The brake regulator must compensate for the altered mutual distance between the wear-resistant contact surface of the brake element and the wear-resistant surface of the wheel.

For ease of intelligibility, the same or similar components are designated with the same or similar reference numerals in the following description of illustrations showing disclosed embodiments.

In the following description of exemplary embodiments as shown in the figures, the brake assembly according to disclosed embodiments is generally designated with the reference numeral 1. The brake assembly 1 includes as its main constituents elements 15, an actuator 13 for driving the brake element 15, the linkage 5 for transferring a braking force from the actuator 13 to the brake element 15, at least one sensor device 8 and a trigger unit 9.

Figure 1:
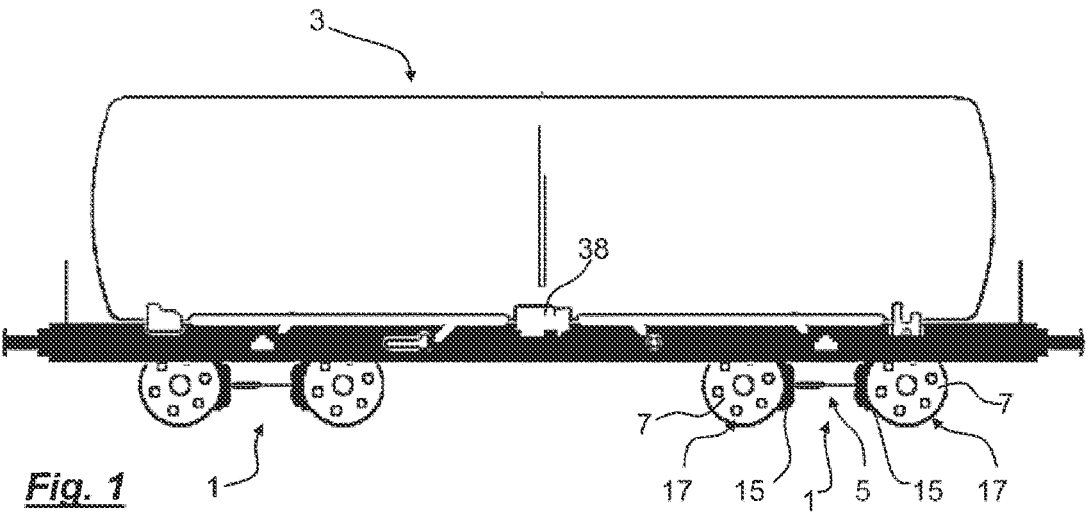
FIG. 1 shows a schematic illustration of a cargo wagon with a brake assembly according to disclosed embodiments.

FIG. 1 shows a rail car 3 realized as an unpowered tank wagon equipped with a brake assembly 1 according to disclosed embodiments. The tank wagon 3 is equipped with two sets of four rail car wheels 7. Each rail car wheel 7 may interact with a respective brake element, which in this case are a realized as a respective brake block 15 arranged facing the tread 17 of the rail car wheel 7. While the rail car 3 is moving, trailing behind a powered locomotive, the brakes are disengaged so that the brake elements 15 do not engage the rail car wheels 7 so as not to impair the car's movement. When a braking action occurs, each brake block 15 is pushed against a corresponding tread 17 of the respective rail car wheel 7 so as to impart friction onto the surface of the tread 17 for slowing down the rail car 3.

Figure 2:
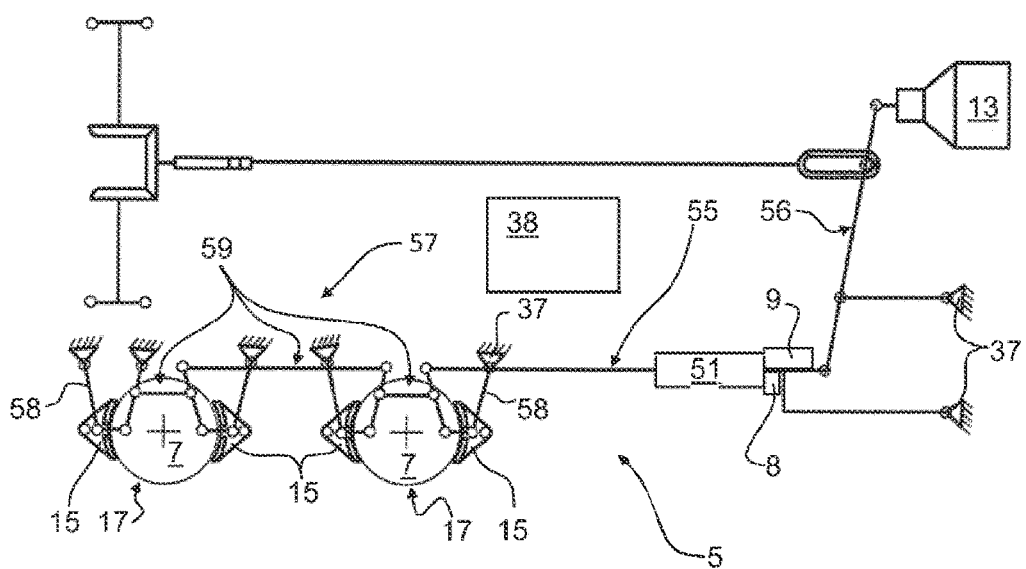
FIG. 2 shows a schematic illustration of the brake assembly according to disclosed embodiments.

A pneumatic cylinder actuator 13 is provided on the rail car 3 which may be controlled to provide a mechanical force to the brake elements 15 through the linkage 5. When pressure is entered into the cylinder actuator 13, it may push against a brake lever 56 to enter a braking force from the actuator 13 into the linkage 5. As illustrated in FIG. 2, the linkage 5 may comprise a brake rigging 57 including rods 54, 55, 59, levers 56 and beams 58. The brake rigging 57 is attached to the car 3 with mounting sections 37. The mounting sections 37 and other components stationary with respect to the rail car 3 which interact with the brake rigging

57 may be described as stationary components of the linkage 5. Movable components of the linkage 5 generally include the brake rigging 57 and the components thereof.

As shown in FIG. 2 and in more detail in FIGS. 3 and 4, the linkage 5 of the brake assembly 1 according to illustrated embodiments includes a brake regulator device 51 realized as a so-called brake slack adjuster. The brake regulator device 51 forms one of the movable components of the brake linkage 5 for transferring a braking force from the actuator 13 to the brake elements 15. The brake regulator device 51 may be configured to adjust the linkage 5 in accordance with a wear level of at least one brake element 15. Due to wear, the free distance between the brake blocks 15 and the corresponding tread 17 of the rail car wheel 7 increases, and the brake regulator device 51 or brake slack adjuster can be configured to allow for the increase in free distance so that, regardless of the current state of wear of the brake element 15, a braking force provided by the actuator 13 always results in the same braking effect on rail car wheels 7.

The rail car 3 may further be provided with one or more sensor devices 8 capable and configured for measuring at least one parameter of the brake assembly 1. In the present embodiment, a particular sensor device 8 including a position sensor 81 will be described in further detail below. The sensor device 8, as shown in detail in FIG. 4, may comprise several components such as a computing device 85, a data storage device 87 and a transmitter 83. The computing device 85 may cooperate with the data storage device 87 to store measurement data collected from a sensor, such as the position sensor 81, and/or to store analysis functions. The computing device 85 may be configured to perform analysis functions on measurement data collected by the sensor in order to determine analysis data, particularly regarding brake wear.

The computing device 85 may further be configured to send and/or receive data via the transmitter 83. For example, the computing device 85 may be configured to send data related to measurement data and/or analysis a data via the transmitter 83. The transmitter 83 may comprise an antenna, such as a WiFi antenna or Bluetooth antenna. Data transmitted from the computing device 85 via the transmitter 83 may be received by a sensor hub 38 of the rail car 3. A sensor hub 38 of the rail car 3 may be provided on the rail car 3 and configured to communicate wire-bound or wireless with one or more sensor devices 8. A sensor hub 38 may further be provided with communication means to communicate with one or more remote systems, such as a cloud-based control and/or diagnosis system (not shown in detail).

The brake assembly 1 is provided with a trigger unit 9 that has a passive state (off) and an active state (on). The trigger unit 9 is configured to enter its active state when a braking action occurs. In the active state, the trigger unit 9 makes the sensor unit 8 active. The trigger unit 9 is activated at the beginning of a stroke of the actuator 13 to wake up the sensor unit 8 so that the sensor unit 8 may start a measurement during a braking action, particularly when full braking occurs. In the active state, the trigger unit 9 activates the sensor device 8. In the passive state, the trigger unit 9 is configured not to activate the sensor device 8. The trigger unit 9 may be configured to leave the sensor device 8 idle in the passive state, or to actively cause the sensor device 8 to enter an inactive state. In the present embodiment, the trigger unit 9 is configured to leave the sensor device 8 idle in the passive state of the trigger unit, so that in the passive state, the trigger unit 9 does not affect whether the sensor unit 8 remains activated, whether the sensor unit 8 changes from active to inactive, or whether the sensor unit 8 remains inactive. For example, the sensor unit 8 can be configured to wake up regardless of an activation by the stroke detector 9, for instance in a regular interval such as every 30 minutes. Optionally, the sensor unit 8, the position sensor 81, the computing device 85 and/or the transmitter 83 may be configured to wake up in correspondence to at least one triggering event in addition to the activation by the stroke detector 9, such as timed triggering event.

The computing device 83 may be configured to perform at least one of the following actions upon having been activated by the trigger unit 9: (i) conduct one or more measurements with a sensor, (ii) perform one or more analysis functions based on the measurement(s), and/or (iii) send measurement data and/or analysis data via the transmitter 83.

In the present embodiment, the sensor device 8 may be configured to turn itself inactive, for example enter a sleep mode or an off mode, after a predetermined time and/or after having performed one or more predetermined actions. The computing device 83 may be configured to turn the sensor device 8 inactive again after performing at least one of the above-mentioned actions (i), (ii), and/or (iii). Alternatively or additionally, the computing device 83 may be configured to run a timer for a predetermined amount of time, such as 20 seconds, before turning the sensor device 8 inactive again.

As shown in FIGS. 2 and 3, the linkage 5 comprises a brake regulator device 51 with a longitudinal moveability attached to two brake rigging rods 54, 55 which may move translationally with respect to one another for setting the regulator device 51. In any given setting of the regulator device, 51, the first and second rod 54, 55 thereof are firmly connected to each other. The first brake rigging rod 54 is coupled to a brake rigging lever 56 attached to the actuator 13. The first brake rigging rod 54 is slidably engaged by a bearing 37 stationary with respect to the wagon 3. The second rigging rod 55 is attached to the brake rigging 57 including beams 58, rods 59 and levers 56 for transferring a braking force from the brake regulator device 51 to the brake elements 15.

In the present embodiment shown in FIGS. 2 and 3, the sensor device 8 and the trigger unit 9 are attached to the brake regulator device 51. The trigger unit 9 is configured to detect any relative movement of the first brake rigging rod 54 relative to the stationary bearing 37. When the relative movement of the first brake rigging rod 54 relative to the stationary bearing 37 occurs, the trigger unit 9 enters its active state. In the active state, the trigger unit 9 activates the sensor unit 8.

The sensor unit 8 shown in detail in FIG. 4 includes a position sensor 81. The position sensor 81 is configured to detect the current setting of the brake regulator device 51. In the shown embodiment, the position sensor 81 is coupled to the first rigging rod 54. The position sensor 81 is realized as an optical sensor attached to a bracket 65 of the first rod 54 arranged within a hollow tube 52. The optical position sensor 81 cooperates with a reflector attached to the spindle 61 acting as a movable adjustment member of the regulator device 51. The position sensor 81 measures the distance d between the optical emitter of the sensor 81 and the reflector. In another alternative not shown in detail, the same principle could be used on the outside using a tension wire.

For example at the end of the braking cycle and/or when the braking force reaches a maximum, the sensor unit 8 may make a measurement with the distance sensor 81 to determine the distance d from the end of the threaded spindle 61 of the slack adjuster 51. The computer device 83 may transmit the distance d to the sensorhub 38 via the transmitter 83 so that wear of the brake blocks 15 can be calculated based on the distance d. The distance d and/or the corresponding brake wear can be transferred from the sensorhub 38 to a server via satellite transmission or radio transmission, where they may be stored for further evaluation.

The trigger unit 9 is firmly attached to the first rod 54 of the regulator device 51. The trigger unit 9 includes a trigger rod 95 movable in a translational direction m which may optionally be parallel to the axial direction of the regulator device 51. The trigger rod 95 engages a component 37 of the linkage 5 stationary with respect to the rail car 3. The trigger rod 95 is movable between a first position and a second position according to the displacement of the linkage in case of a braking action. The rod 95 is in a first position while no braking action occurs and it is in a second position when a braking action occurs. FIG. 4 shows the rod 95 in the second position. A biasing means 97 urges the rod 95 towards the first position. The trigger rod 95 is coupled to a protrusion 96 for engaging a mechanical switch 91 of a relay 93. The relay 93 is configured as a wake-up-switch for activating the sensor unit 8. In particular, the relay 93 may be configured so that the trigger unit 9 is in a passive state in which the switch 91 is depressed and enters and enters an active state once the switch 91 is released.

At the beginning of the braking action, the first rigging rod 54 is pulled by the lever 56 as the lever 56 is pushed by the actuator piston 13 and thereby rotated around a kingpin held by a stationary bearing 37. During the translational movement of the rod 54, the trigger rod 95 of the trigger unit 9 which is fixed to the rod 54 moves away from the stationary bearing ring 37 coupled to the chassis of the car 3. Thereby, the trigger rod 95 and the protrusion 96 attached thereto are moved relative to the rod 54 so that the protrusion 96 presses the switch 91 which is fixed stationary in regard to the brake rigging rod 54 which causes switch 94 to activate the relay 93 to wake up the sensor unit 8.

LIST OF REFERENCE NUMERALS 1 brake assembly
3 rail car
5 linkage
7 rail car wheel
8 sensor device
9 trigger unit
13 actuator
15 brake element
17 tread
37 stationary component
38 sensor hub
51 brake regulator device
54, 55, 59 brake rigging rod
56 brake rigging lever
57 brake rigging
61 adjustment member
65 bracket
58 brake rigging beam
81 position sensor
83 transmitter
85 computing device
87 data storage device
91 switch 93 relay
95 trigger rod
96 protrusion
97 spring
d distance

The invention claimed is:

1. A brake for a rail car comprising:
at least one brake element configured to press against a rotor of a rail car wheel in response to a braking action;
an actuator configured to drive the brake element;
a linkage configured to transfer a braking force from the actuator to the brake element;
at least one sensor device configured to measure at least one parameter of the brake assembly; and
a trigger unit configured to enter its active state in response to a braking action occurence,
wherein the trigger unit activates the sensor device in the active state,
wherein the trigger unit comprises a microswitch that includes a mechanically actuated relay for opening and/or closing an electronic circuit, and
wherein the trigger unit includes a trigger rod moveable between a first position and a second position, wherein the trigger rod is in its first position while no braking action occurs and/or wherein a protrusion coupled with the trigger rod engages an electromechanical closing member of the relay in the first or second position, wherein the trigger unit further comprises a mechanism for biasing the trigger rod towards the first or second position.

2. The brake assembly of claim 1, wherein the trigger unit is connected to the linkage.

3. The brake assembly of claim 1, wherein the linkage includes at least one brake regulator device configured to adjust the linkage in accordance with a wear level of the at least one brake element, and wherein the trigger unit is connected to the linkage between the brake regulator device and the actuator.

4. The brake assembly of claim 3, wherein the trigger unit is attached to the brake regulator device.

5. The brake assembly of claim 3, wherein a position sensor measures the distance between two reference points of the brake regulator device.

6. The brake assembly of claim 1, wherein the trigger unit is configured to enter its active state in response to detection of linkage displacement.

7. The brake assembly of claim 6, wherein the trigger unit is configured to enter its active state in response to detection of displacement of a first moveable component of the linkage in relation to a stationary component of the linkage.

8. The brake assembly of claim 7, wherein the trigger unit is configured to detect a displacement between a brake regulator device and a stationary component of the linkage system.

9. The brake assembly of claim 7, wherein the displacement of the first moveable component of the linkage in relation to the stationary component of the linkage detects movement in a mounting section connecting the linkage to the rail car, in relation to a second moveable component of the linkage and/or or in relation to a rail car chassis of the rail car.

10. The brake of claim 1, wherein the sensor device includes a transmitter for sending at least one parameter of the brake assembly to a sensor hub of the rail car, wherein the transmitter is only activated in the active state and/or by at least one triggering event.

11. The brake assembly of claim 10, wherein the sensor device includes a computing device and a data storage device, wherein the computing device is only activated in the active state and/or by at least one triggering event, and wherein the computing device is configured to calculate a parameter indicating brake wear based on the measurement of a position sensor and to cause the transmitter to send the parameter indicating brake wear.

12. The brake assembly of claim 1, wherein the sensor device includes a linkage position sensor for determining a position of a first component of the linkage in relation to a second component of the linkage.

13. The brake assembly of claim 1, wherein a position sensor is only activated in the active state and/or by at least one triggering event.

* * * * *